US009450816B2

(12) United States Patent
Akisada et al.

(10) Patent No.: US 9,450,816 B2
(45) Date of Patent: Sep. 20, 2016

(54) PROVISIONING DEVICE, AND METHOD OF SETTING NETWORK PARAMETER IN PROVISIONING NETWORK

(75) Inventors: Yukiyo Akisada, Tokyo (JP); Kazunori Miyazawa, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 1019 days.

(21) Appl. No.: 13/434,063

(22) Filed: Mar. 29, 2012

(65) Prior Publication Data
US 2012/0259990 A1 Oct. 11, 2012

(30) Foreign Application Priority Data
Mar. 31, 2011 (JP) ................ P2011-078743

(51) Int. Cl.
G06F 15/16 (2006.01)
H04L 12/24 (2006.01)

(52) U.S. Cl.
CPC ....... H04L 41/0809 (2013.01); H04L 12/2426 (2013.01)

(58) Field of Classification Search
USPC ....... 709/201, 202, 203, 217, 218, 219, 220, 709/221, 222, 223, 224, 225, 226, 227, 228, 709/229
See application file for complete search history.

(56) References Cited

U.S. PATENT DOCUMENTS

| | | | |
|---|---|---|---|
| 6,188,689 B1* | 2/2001 | Katsube | H04L 12/4608 370/252 |
| 6,731,604 B1* | 5/2004 | Chugo | H04L 12/4608 370/238 |
| 6,732,177 B1* | 5/2004 | Roy | 709/227 |
| 8,111,654 B2* | 2/2012 | Ngo | H04L 1/06 370/329 |
| 2002/0057690 A1* | 5/2002 | Kingsley | H04L 12/2602 370/392 |
| 2002/0101842 A1* | 8/2002 | Harrison | H04L 12/4625 370/338 |
| 2005/0111455 A1* | 5/2005 | Nozue | H04L 12/4645 370/392 |
| 2005/0166123 A1* | 7/2005 | Yanamoto | H04L 1/0071 714/776 |
| 2006/0139201 A1* | 6/2006 | Nagata | H04W 28/06 342/1 |
| 2007/0127363 A1* | 6/2007 | Chaudry et al. | 370/216 |
| 2007/0127364 A1* | 6/2007 | Chaudry et al. | 370/216 |
| 2007/0147299 A1* | 6/2007 | Ando et al. | 370/331 |

(Continued)

FOREIGN PATENT DOCUMENTS

CN 1954278 A 4/2007
WO 2009108373 A2 9/2009

OTHER PUBLICATIONS

European Search Report corresponding to European Patent Application No. 12161930.8, dated Jul. 19, 2012.

(Continued)

Primary Examiner — Saket K Daftuar
(74) Attorney, Agent, or Firm — Sughrue Mion, PLLC

(57) ABSTRACT

A provisioning device connected to field devices, which are objects of provisioning, via a provisioning network separated from a target network may include a router advertisement unit that designates a field device, which is an object of provisioning, among the field devices located within a router advertisement zone of the provisioning device to transmit a router advertisement to the designated field device in a unicast mode, a connection control unit that controls a connection to the provisioning network of the field device that receives the router advertisement, and a parameter setting unit that performs setting of network parameters in the field device, the network parameters being managed by the field device.

18 Claims, 11 Drawing Sheets

(56) References Cited

U.S. PATENT DOCUMENTS

| | | | |
|---|---|---|---|
| 2007/0223494 A1* | 9/2007 | Hyyrynen et al. | 370/395.54 |
| 2008/0008148 A1* | 1/2008 | Sagawa | H04L 12/4625 370/338 |
| 2009/0003232 A1* | 1/2009 | Vaswani et al. | 370/252 |
| 2009/0003356 A1* | 1/2009 | Vaswani et al. | 370/400 |
| 2009/0085769 A1 | 4/2009 | Thubert et al. | |
| 2009/0228611 A1 | 9/2009 | Ferguson et al. | |
| 2009/0292524 A1 | 11/2009 | Anne et al. | |
| 2009/0296601 A1* | 12/2009 | Citrano et al. | 370/254 |
| 2010/0290351 A1 | 11/2010 | Toepke et al. | |
| 2011/0040992 A1* | 2/2011 | Mizunashi | H04L 12/10 713/310 |
| 2011/0202270 A1* | 8/2011 | Sharma et al. | 701/201 |
| 2011/0261812 A1* | 10/2011 | Kini | H04L 12/4633 370/389 |
| 2012/0071084 A1* | 3/2012 | Gholmieh et al. | 455/3.01 |
| 2013/0157692 A1* | 6/2013 | Hall et al. | 455/456.3 |
| 2014/0219193 A1* | 8/2014 | Linde et al. | 370/329 |

OTHER PUBLICATIONS

Jonathan W. Hui, et al., IPV6 in Low-Power Wireless Networks, Invited Paper, vol. 98, No. 11, Nov. 2010, pp. 1865-1878.

"Wireless Systems for Industrial Automation: Process and Control Related Applications", ISA-100, 11a-2009, 14 Provisioning, pp. 666-693.

"Wireless Systems for Industrial Automation: Process Control and Related Applications", ISA-100, 11a-2009, 14 Provisioning, pp. 666-693.

* cited by examiner

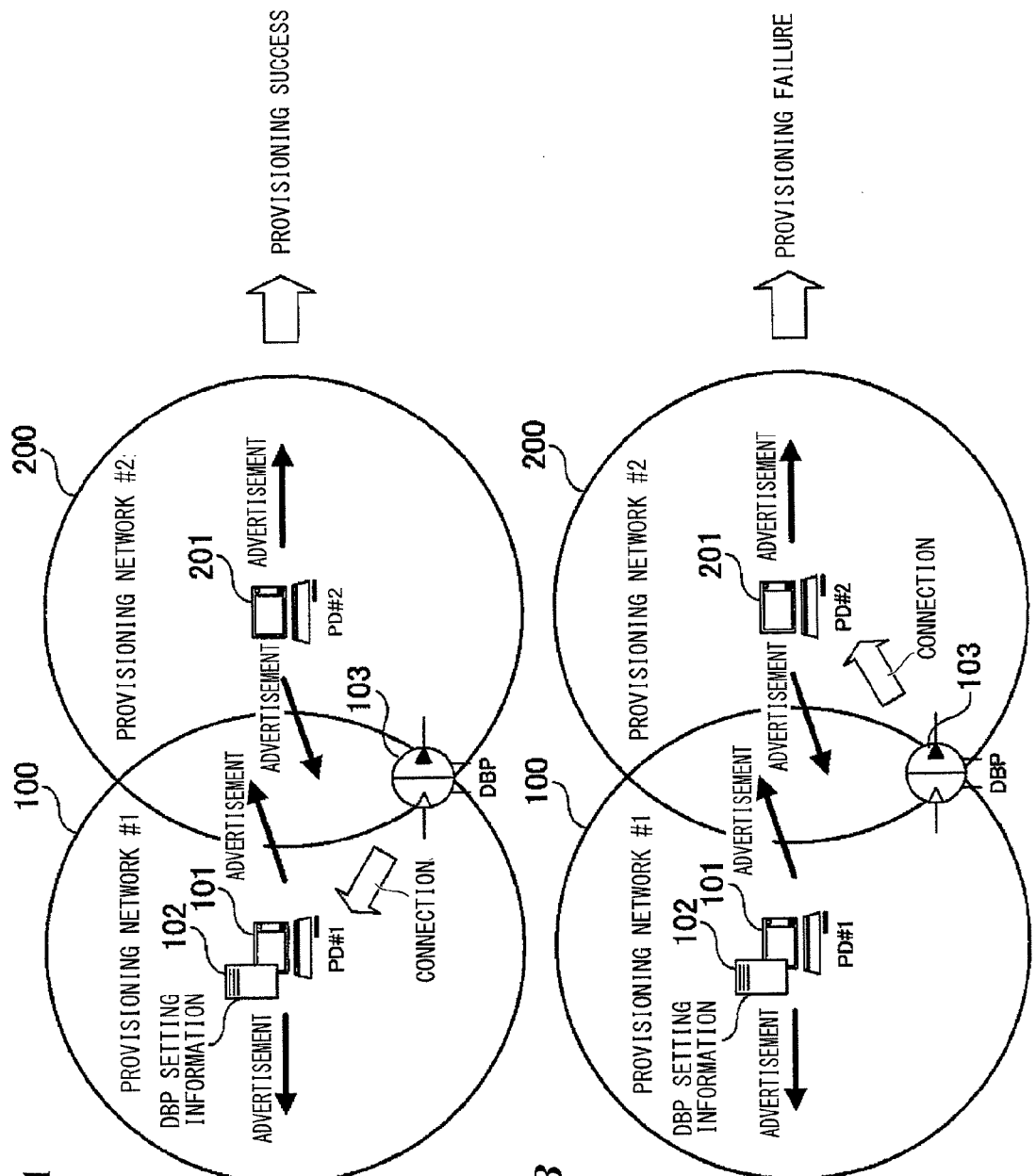

PROVISIONING DEVICE, AND METHOD OF SETTING NETWORK PARAMETER IN PROVISIONING NETWORK

BACKGROUND OF THE INVENTION

1. Field of the Invention

The present invention relates to a provisioning device (PD) connected to a field device, which is an object of provisioning, via a provisioning network separated from a target network, and a method of setting network parameters in the provisioning network.

Priority is claimed on Japanese Patent Application No. 2011-078743, filed Mar. 31, 2011, the contents of which are incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In an industrial wireless communication standard, a setting process of a PD, which manages setting information of field devices, for a connection to a target network for a field device (device to be provisioned (DBP)) is referred to as provisioning. The provisioning includes over-the-air (OTA) provisioning, which is performed according to a wireless communication protocol actually using communication between the PD and the DBP for control, and out-of-band (OOB) provisioning, which is performed according to a communication protocol other than a communication protocol actually used for control, such as infrared communication or the like.

OTA provisioning includes a method in which the PD on a target network for the DBP installed in a field directly performs provisioning and a method in which a handheld device (hereinafter referred to as a handheld PD) having a PD function provisions the DBP in a network separated from the target network. In the OTA provisioning, a network that performs the provisioning is referred to as a provisioning network, and is used separately from the target network.

FIG. 9 is a diagram illustrating an OTA provisioning process using a handheld PD 101. In the provisioning using the handheld PD 101, network parameters and security parameters (hereinafter collectively referred to as network parameters 102) necessary for a DBP 103 to connect to a target network 200 are set by the handheld PD 101 in a provisioning network 100 separated from the target network 200 are set. Once the setting is completed, the DBP 103 can be connected to the target network 200.

In FIG. 9, a control network 300 such as industrial Ethernet is connected to the target network 200 via a gateway 201. Further, a configurator 301, a distributed control system (DCS) 302, and a management tool 303 are connected to the control network 300.

FIG. 10 is a diagram illustrating the provisioning process. The handheld PD 101 has a function of a routing device, and the handheld PD 101 also periodically transmits a router advertisement to the provisioning network 100 in a broadcast mode as in the routing device (S1). In FIG. 10, the inside of a circle represents a range in which the router advertisement can be received. If the DBP 103 located within a router advertisement zone of the handheld PD 101 receives the router advertisement, the DBP 103 can be connected to the handheld PD 101 by acquiring information about the provisioning network 100 (S2). An actual connection process includes a plurality of transactions.

If the connection to the handheld PD 101 is completed, the handheld PD 101 sets network parameters (DBP setting information 102) for connecting the DBP 103 to a target network (not illustrated) (S3). The actual setting process includes a plurality of transactions. Details of the connection process during the above-described provisioning are disclosed, for example, in "ISA-100.11a-2009 Wireless systems for industrial automation: Process control and related applications, 14 Provisioning, pp. 666 to 693."

Incidentally, according to a method of setting network parameters in a provisioning network in the related art described above, there is a problem in that the handheld PD 101 does not uniquely select a DBP 103 as an object of provisioning from among all DBPs 103 located within the router advertisement zone of the handheld PD 101 as objects of provisioning. In addition, because all handheld PDs 101, which are transmission sources of router advertisements, are connection candidates, the provisioning may fail if the DBP 103 is connected to an inappropriate handheld PD 101.

Here, although an example in which International Society of Automation (ISA) 100.11a is used as an industrial wireless communication standard has been described, the industrial wireless communication standard is not limited to ISA 100.11a. The same problem occurs in a communication protocol in which the same operation as in ISA 100.11a is performed. Hereinafter, its details will be described.

First, a problem in the provisioning process for a plurality of DBPs 103 and 104 will be described using FIG. 11. Although DBP #1 (103) and DBP #2 (104) are located within a router advertisement zone of the handheld PD 101 in FIG. 11, the handheld PD 101 is assumed to manage setting information of only DBP #1 (103). In ISA 100.11a, DBP #1 (103) and DBP #2 (104) receive the router advertisement together because the handheld PD 101 transmits the router advertisement in a broadcast mode (S1). Subsequently, DBP #1 (103) and DBP #2 (104) receiving the router advertisement are connected to the handheld PD 101 (S2).

If a process of connecting to the handheld PD 101 of DBP #1 (103) and DBP #2 (104) is completed, the handheld PD 101 performs setting of network parameters to DBP #1 (103) and DBP #2 (104). However, in this example, the provisioning for DBP #2 (104) fails even when the provisioning directed to DBP #1 (103) succeeds because the handheld PD 101 manages only the setting information of DBP #1 (103) (S3). That is, there is a problem in that DBP #1 (103) and DBP #2 (104) located within the router advertisement zone are randomly connected to the handheld PD 101, regardless of the provisioning object of the handheld PD 101.

Next, a problem in the provisioning process by a plurality of handheld PDs, that is, handheld PD#1 (101) and handheld PD #2 (201), will be described using FIGS. 12A and 12B. In FIGS. 12A and 12B, handheld PD #1 (101) and handheld PD #2 (201) are located in the neighborhood and the DBP 103 is located in an overlapping portion between provisioning network #1 (100) and provisioning network #2 (200). The setting information of the DBP 103 is assumed to be managed only by handheld PD #1 (101).

As illustrated in FIG. 12A, the provisioning by PD #1 (101) ends in success if the DBP 103 is connected to handheld PD #1 (101). As illustrated in FIG. 12B, the provisioning ends in failure because handheld PD #2 (201) does not manage the setting information of the DBP 103 if the DBP 103 is connected to handheld PD #2 (201). According to ISA 100.11a, a handheld PD selection method relies upon implementation without being defined. Therefore, the DBP is likely to search for a handheld PD by trial and error according to implementation of the DBP, and the certainty that the DBP selects an optimum handheld PD is not ensured.

SUMMARY

The present invention provides a PD and a method of setting network parameters in a provisioning network, which are aimed to improve interconnection by improving a random selection scheme having randomness between a PD and a field device.

A provisioning device connected to field devices, which are objects of provisioning, via a provisioning network separated from a target network may include: a router advertisement unit that designates a field device, which is an object of provisioning, among the field devices located within a router advertisement zone of the provisioning device to transmit a router advertisement to the designated field device in a unicast mode; a connection control unit that controls a connection to the provisioning network of the field device that receives the router advertisement; and a parameter setting unit that performs setting of network parameters in the field device, the network parameters being managed by the field device.

According to the present invention, a router advertisement unit transmits a router advertisement in a unicast mode by uniquely designating a field device that is an object of provisioning among field devices located within a router advertisement zone, a connection control unit controls a connection to a provisioning network of a field device receiving the router advertisement, and a parameter setting unit performs setting of managed network parameters to the designated field device after the field device receiving the router advertisement is connected to the provisioning network. In order to transmit the router advertisement in the unicast mode as described above, the PD can uniquely designate the field device that is the object of provisioning and thus remove uncertainty related to a connection between the PD and the field device. In addition, even when a plurality of PDs are in the neighborhood, a field device located in an overlapping portion between provisioning networks can avoid unnecessary router advertisement reception and optimize a PD search process. As a result, the field device can avoid a random PD search by trial and error and reduce resource consumption.

The router advertisement unit may generate an address associated with the network parameters of the field device as a destination address in a medium access control (MAC) sub-layer header of a router advertisement frame and transmits the router advertisement to an arbitrary field device, which is the object of provisioning, of the provisioning device in the unicast mode. Because setting information of each field device is defined to be identified for each extended unique identifier (EUI)-64 address of the field device, for example, according to an ISA 100.11 a wireless communication standard, the router advertisement unit can transmit the router advertisement to an arbitrary field device in the unicast mode using an EUI-64 address associated with setting information of the field device managed by the PD as a destination address of a medium access control (MAC) sub-layer header.

The router advertisement unit may transmit the router advertisement in a broadcast mode if there is no response from the field device, which is the object of provisioning, for the router advertisement transmitted in the unicast mode. According to the present invention, it is possible to maintain compatibility for a field device incapable of receiving the router advertisement transmitted in the unicast mode.

The router advertisement unit may dynamically acquire a list of all of the field devices located within the router advertisement zone by transmitting the router advertisement in a broadcast mode before the router advertisement is transmitted in the unicast mode. According to the present invention, the PD can actually transmit the router advertisement only to the field device in operation within the router advertisement zone without randomly transmitting the router advertisement to all field devices of which setting information is managed, so that unnecessary resource consumption can be avoided.

When the router advertisement unit dynamically acquires the list of the field devices, the connection control unit may transmit a message indicating temporary connection rejection for a connection request of the field device to reject participation in the provisioning network of the field device that has issued the connection request. According to the present invention, the connection control unit can quickly transition the field device to a state of waiting for the router advertisement by explicitly transmitting a message indicating temporary connection rejection for a connection request of the field device.

When the router advertisement unit dynamically acquires the list of the field devices, the connection control unit may temporarily disconnect the field device from the provisioning network by sending a restart request to the field device that ends the connection to the provisioning network. According to the present invention, the connection control unit can quickly transition the field device to a state of waiting for the router advertisement by sending a restart request to the field device ending a connection to the provisioning network and temporarily disconnecting the field device.

A method of setting network parameters in a provisioning network system including field devices, which are objects of provisioning, and a provisioning device connected to the field devices via a provisioning network separated from a target network may include: an advertisement step of uniquely designating, by the provisioning device, a field device that is an object of provisioning among the field devices located within a router advertisement zone and performing transmission in a unicast mode; a connection step of issuing, by the field device receiving the router advertisement, a connection request and connecting to the provisioning network; and a provisioning step of performing, by the provisioning device, setting of managed network parameters for the designated field device.

According to the present invention, in order to transmit the router advertisement in the unicast mode as described above, the PD can uniquely designate the field device that is an object of provisioning and thus remove uncertainty related to a connection between the PD and the field device. In addition, even when a plurality of PDs are in the neighborhood, a field device located in an overlapping portion between provisioning networks can avoid unnecessary router advertisement reception and optimize a PD search process. As a result, the field device can avoid a random PD search by trial and error and reduce resource consumption.

According to the present invention, it is possible to provide a PD and a method of setting network parameters in a provisioning network, which are aimed to improve interconnection by improving a random selection scheme having randomness between a PD and a field device.

BRIEF DESCRIPTION OF THE DRAWINGS

The above features and advantages of the present invention will be more apparent from the following description of certain preferred embodiments taken in conjunction with the accompanying drawings, in which:

FIGS. 12A and 12B are diagrams illustrating the provisioning process by the plurality of provisioning devices.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

Configuration of Preferred Embodiment

Figure 1:
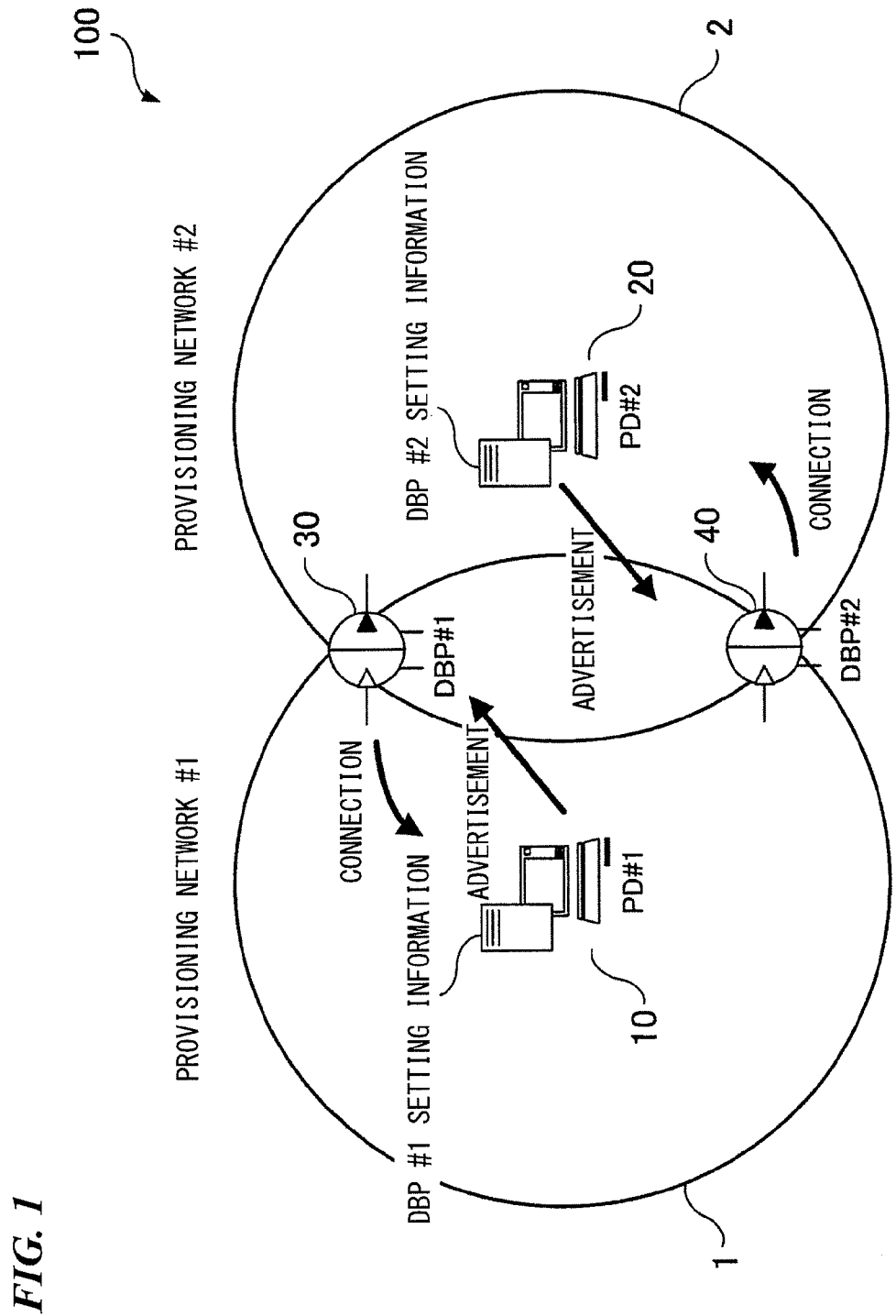
FIG. 1 is a diagram schematically illustrating a provisioning process by a PD in accordance with a first preferred embodiment of the present invention.

FIG. 1 is a diagram schematically illustrating a provisioning process by a PD in accordance with a first preferred embodiment of the present invention. A provisioning network system 100 includes provisioning network #1 (1) and provisioning network #2 (2). Provisioning network #1 (1) represents a router advertisement zone of handheld PD #1 (10), which is a PD. Provisioning network #2 (2) represents a router advertisement zone of handheld PD #2 (20), which is a PD. DBP #1 (30) and DBP #2 (40), which are field devices, are located in an overlapping portion between provisioning network #1 (1) and provisioning network #2 (2).

Handheld PD #1 (10) searches for DBP #1 (30) and DBP #2 (40), which are the field devices located within the router advertisement zone, and transmits a router advertisement to DBP #1 (30) in a unicast mode by referring to DBP #1 setting information managed by handheld PD #1 (10). Thereby, handheld PD #1 (10) can uniquely provision DBP #1 (30) and removes uncertainty related to a connection between handheld PD #1 (10) and DBP #1 (30).

In the related art, because a router advertisement transmitted by handheld PD #1 (10) is transmitted in a broadcast mode, DBP #1 (30) and DBP #2 (40) located in an overlapping portion between provisioning network #1 (1) and provisioning network #2 (2) do not determine which of provisioning network #1 (1) and provisioning network #2 (2) is a better connection thereto.

Hereinafter, a PD and a method of setting network parameters in a provisioning network in accordance with the first preferred embodiment of the present invention will be described in detail with reference to FIG. 2 and the subsequent drawings.

Figure 2:
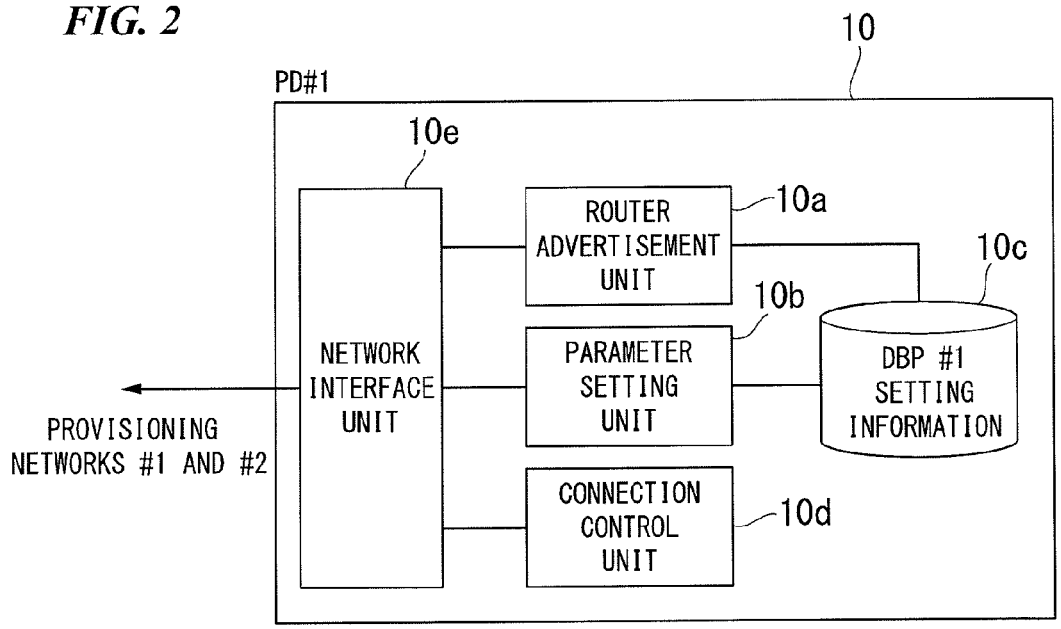
FIG. 2 is a block diagram illustrating a configuration of the PD in accordance with the first preferred embodiment of the present invention.

FIG. 2 is a block diagram illustrating a configuration of the PD in accordance with the first preferred embodiment of the present invention. Here, handheld PD #1 (10) of FIG. 1 is illustrated as the PD. PD #2 (20) is also assumed to have the same configuration as handheld PD #1 (10). Handheld PD #1 (10) includes a router advertisement unit 10a, a parameter setting unit 10b, DBP #1 setting information 10c in which network parameters are stored, a connection control unit 10d, and a network interface unit 10e.

The router advertisement unit 10a uniquely designates a DBP that is an object of provisioning among DBPs located within the router advertisement zone of handheld PD #1 (10), and transmits the router advertisement to the designated DBP in the unicast mode. After the DBP receiving the router advertisement is connected to provisioning network #1, the parameter setting unit 10b performs setting of managed network parameters of the DBP to the designated DBP. At this time, information stored in the DBP #1 setting information 10c is used as the set network parameters. In addition, the connection control unit 10d processes a connection request of the DBP.

The router advertisement unit 10a generates an address associated with network parameters of the DBP as a destination address in a MAC sub-layer header of a router advertisement frame, and transmits the router advertisement to an arbitrary DBP that is an object of provisioning in the unicast mode. In addition, when there is no response from the DBP that is the object of provisioning for the router advertisement transmitted in the unicast mode, the router advertisement unit 10a may transmit the router advertisement in the broadcast mode.

In addition, before the router advertisement is transmitted in the unicast mode, the router advertisement unit 10a may dynamically acquire a list of all DBPs located within the router advertisement zone by transmitting the router advertisement in the broadcast mode. At this time, the connection control unit 10d transmits a message for temporarily rejecting the connection request of the DBP and rejects participation in a provisioning network of the DBP issuing the connection request, or requests the DBP ending a connection to the provisioning network to perform a restart operation and temporarily disconnects the DBP from the provisioning network.

Figure 3A:
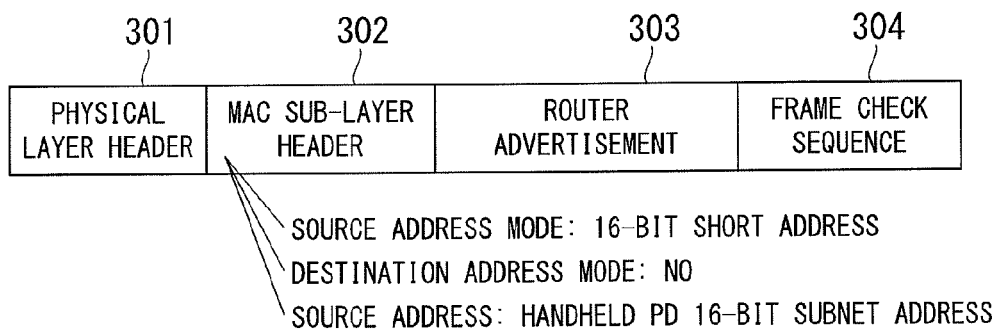
FIGS. 3A and 3B are diagrams illustrating a format of the router advertisement frame generated by the PD in accordance with the first preferred embodiment of the present invention.
Figure 3B:
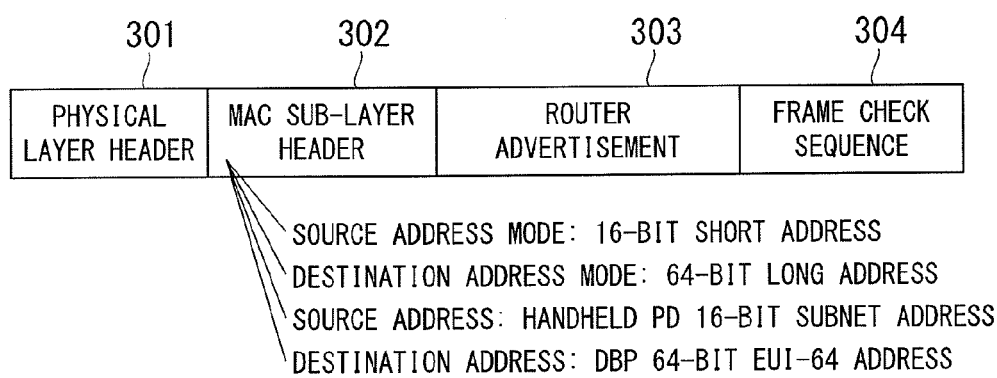

FIGS. 3A and 3B illustrate a format of the router advertisement frame in which the router advertisement unit 10a provides the router advertisement. FIG. 3A illustrates the router advertisement of the related art by broadcast transmission. FIG. 3B illustrates the router advertisement in accordance with the first preferred embodiment of the present invention by unicast transmission. Any router advertisement frame includes data fields of a physical layer header 301, a MAC sub-layer header 302, a router advertisement 303, and a frame check sequence 304.

In ISA 100.11 a, an Institute of Electrical and Electronics Engineers (IEEE) 802.15.4 communication standard is used in a physical layer and uniqueness of the MAC sub-layer header 302 is ensured only within a wireless subnet. In the MAC sub-layer header 302, two types of addresses of a 16-bit subnet address and an EUI-64 address of which uniqueness is globally ensured can be used. A source address, which is a transmission source of the router advertisement and a destination address, which is a transmission destination, are designated in the MAC sub-layer header 302. In addition, a type of address to be used at this time is also designated in the MAC sub-layer header 302. In ISA 100.11a, a 16-bit subnet address is generally used and the source address related to the router advertisement becomes a 16-bit subnet address of handheld PD #1 (10). In the advertisement frame of FIG. 3A, it can be seen that the destination address is omitted and the router advertisement is transmitted therefrom in the broadcast mode.

In the PD in accordance with the first preferred embodiment of the present invention, uncertainty related to connections between handheld PD #1 (10) and DBP #1 (30) and DBP #2 (40) illustrated in FIG. 1 is removed by transmitting the router advertisement in the unicast mode, not in the broadcast mode. Thus, as indicated by the format of the router advertisement frame generated and transmitted by the router advertisement unit 10a in FIG. 3B, there is provided a structure in which an EUI-64 address of DBP #1 (30) that is the object of provisioning is designated as the destination address of the MAC sub-layer header 302. Because the 16-bit subnet address of DBP #1 (30) is set in a process of connecting to handheld PD #1 (10), it may be impossible to use the 16-bit subnet address of DBP #1 (30) before the connection to handheld PD #1 (10).

According to ISA 100.11a, setting information of each DBP is defined to be identified for each EUI-64 address of the DBP. Therefore, it is possible to transmit a router advertisement to an arbitrary DBP in the unicast mode using the EUI-64 address associated with managed setting information of DBP #1 (30) as the destination address of the MAC sub-layer header 302.

That is, the router advertisement unit 10a performs unicast transmission by uniquely designating DBP #1 (30) that is the object of provisioning between DBP #1 (30) and DBP #2 (40) located within the router advertisement zone according to the advertisement frame illustrated in FIG. 3B. The connection control unit 10d processes a connection request sent by the DBP receiving the router advertisement to provisioning network #1. After the DBP receiving the router advertisement is connected to provisioning network #1, the parameter setting unit 10b performs setting of network parameters (the DBP #1 setting information 10c) managed by the PD to the designated DBP #1 (30).

Figure 4A:
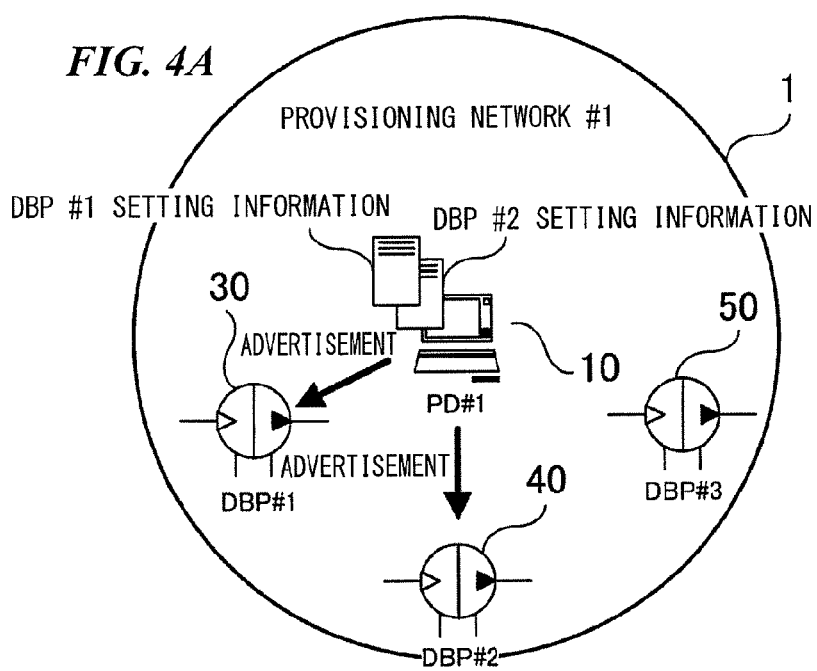
FIGS. 4A and 4B are diagrams illustrating a process of provisioning by the PD in accordance with the first preferred embodiment of the present invention.
Figure 4B:
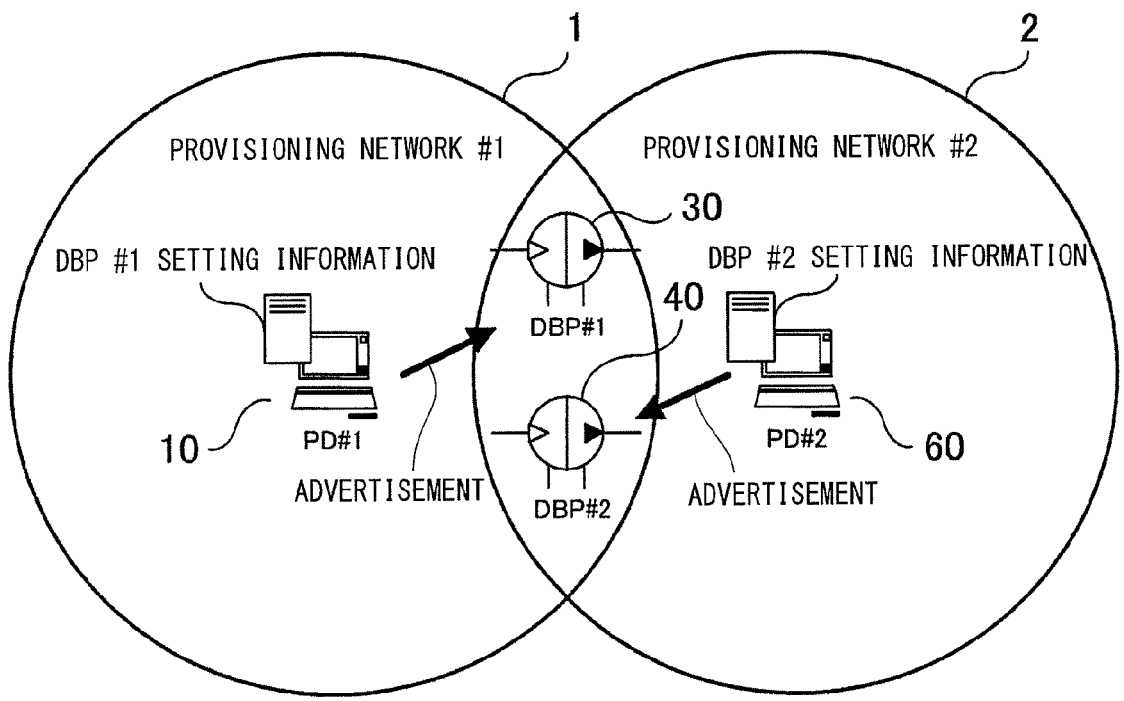

Thereby, handheld PD #1 (10) can uniquely designate DBP #1 (30) that is the object of provisioning. FIGS. 4A and 4B are diagrams illustrating a process of provisioning by the PD in accordance with the first preferred embodiment of the present invention. As illustrated in FIG. 4A, handheld PD #1 (10) having DBP #1 setting information and DBP #2 setting information can transmit the router advertisement only to DBP #1 (30) and DBP #2 (40), which are the objects of provisioning, even when DBP #1 (30), DBP #2 (40), and DBP #3 (50) are in the router advertisement zone. At this time, because handheld PD #1 (10) does not transmit the router advertisement to DBP #3 (50), DBP #3 (50) can prevent provisioning from ending in failure without establishing a connection to handheld PD #1 (10).

In addition, as illustrated in FIG. 4B, DBP #1 (30) and DBP #2 (40) located in an overlapping portion between provisioning networks #1 and #2 can avoid unnecessary router advertisement reception even when handheld PD #1 (10) and handheld PD #2 (60) are in the neighborhood. Specifically, handheld PD #1 (10) managing setting information of DBP #1 (30) transmits the router advertisement only to DBP #1 (30) in the unicast mode. Handheld PD #2 (60) managing setting information of DBP #2 (40) transmits the router advertisement only to DBP #2 (40) in the unicast mode, so that DBP #1 (30) and DBP #2 (40) can be optimally connected to handheld PD #1 (10) and handheld PD #2 (60), respectively.

As described above, DBP #1 (30) and DBP #2 (40) optimize a process of searching for handheld PDs #1 (10) and #2 (60), so that a random search of handheld PDs #1 (10) and #2 (60) by trial and error can be avoided and DBPs #1 (30) and #2 (40) can reduce resource consumption by a handheld PD search.

Even when a process of OTA provisioning using the handheld PD is optimized by transmitting the router advertisement in the unicast mode according to the PD related to the above-described preferred embodiment of the present invention, the router advertisement transmitted in the unicast mode according to the implementation of the DBP is likely not to be received. It is possible to maintain compatibility for the DBP incapable of receiving the router advertisement transmitted in the unicast mode by making an extension as will be described later.

Figure 5A:
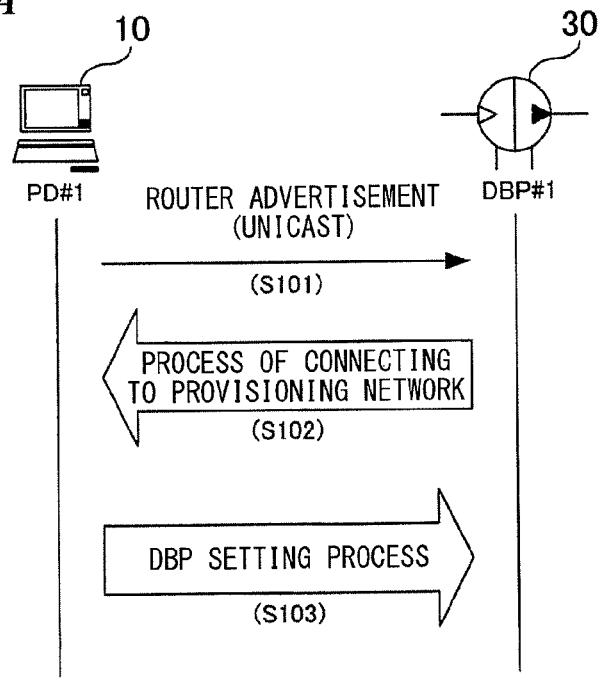
FIGS. 5A and 5B are sequence diagrams illustrating a provisioning process by the PD in accordance with the first preferred embodiment of the present invention.
Figure 5B:
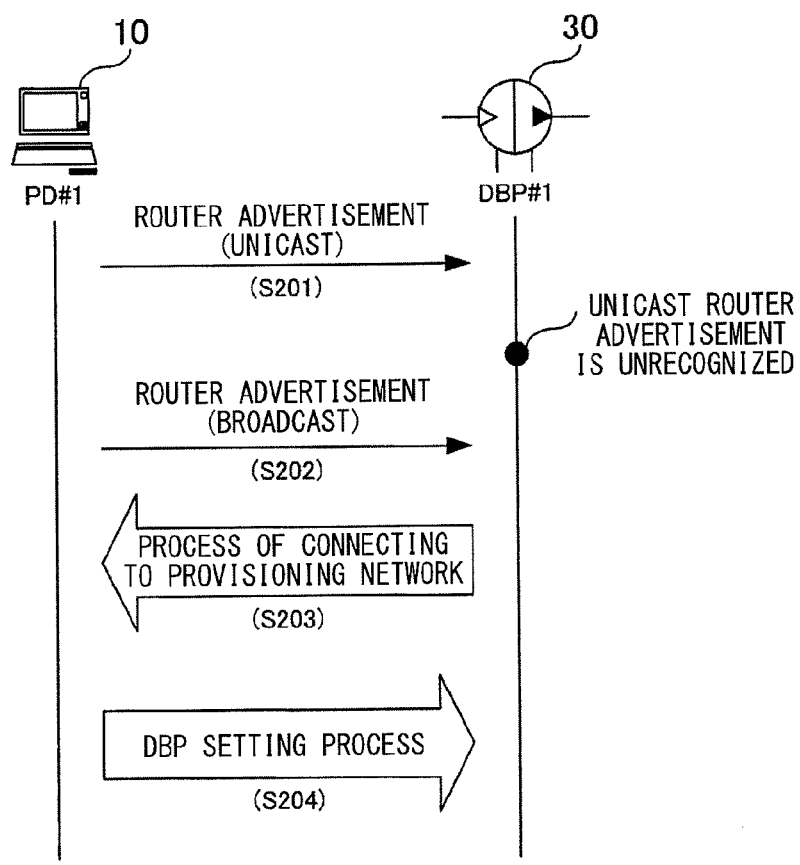

FIGS. 5A and 5B are sequence diagrams illustrating a provisioning process by the PD in accordance with the first preferred embodiment of the present invention. In FIG. 5A, handheld PD #1 (10) transmits the router advertisement to DBP #1 (30) in the unicast mode (step S101). DBP #1 (30) receiving the router advertisement is connected to the provisioning network (step S102). Here, if the connection is completed, handheld PD #1 (10) performs setting of network parameters to DBP #1 (30) (step S103). However, because the router advertisement is transmitted in the broadcast mode according to the ISA 100.11a communication standard, the router advertisement transmitted in the unicast mode is likely not to be received according to implementation of the DBP.

As illustrated in FIG. 5B, if there is no response from DBP #1 (30) for the router advertisement subjected to unicast transmission (step S201), handheld PD #1 (10) transmits the router advertisement in the broadcast mode (step S202). As in the related art, DBP #1 (30) receiving the router advertisement is connected to the provisioning network 1 (step S203). Here, if the connection is completed, handheld PD #1 (10) performs setting of network parameters to DBP #1 (30) (step S204). Thereby, it is possible to fall back to the provisioning process based on the ISA 100.11a communication standard.

In addition, it is also possible to transmit the router advertisement in the broadcast mode once per DBP search, dynamically acquire EUI-64 addresses of all DBPs located within the router advertisement zone from a result of a connection request to the provisioning network of the DBP, and re-designate an EUI-64 address to advertise the re-designated EUI-64 address in the unicast mode.

Figure 6:
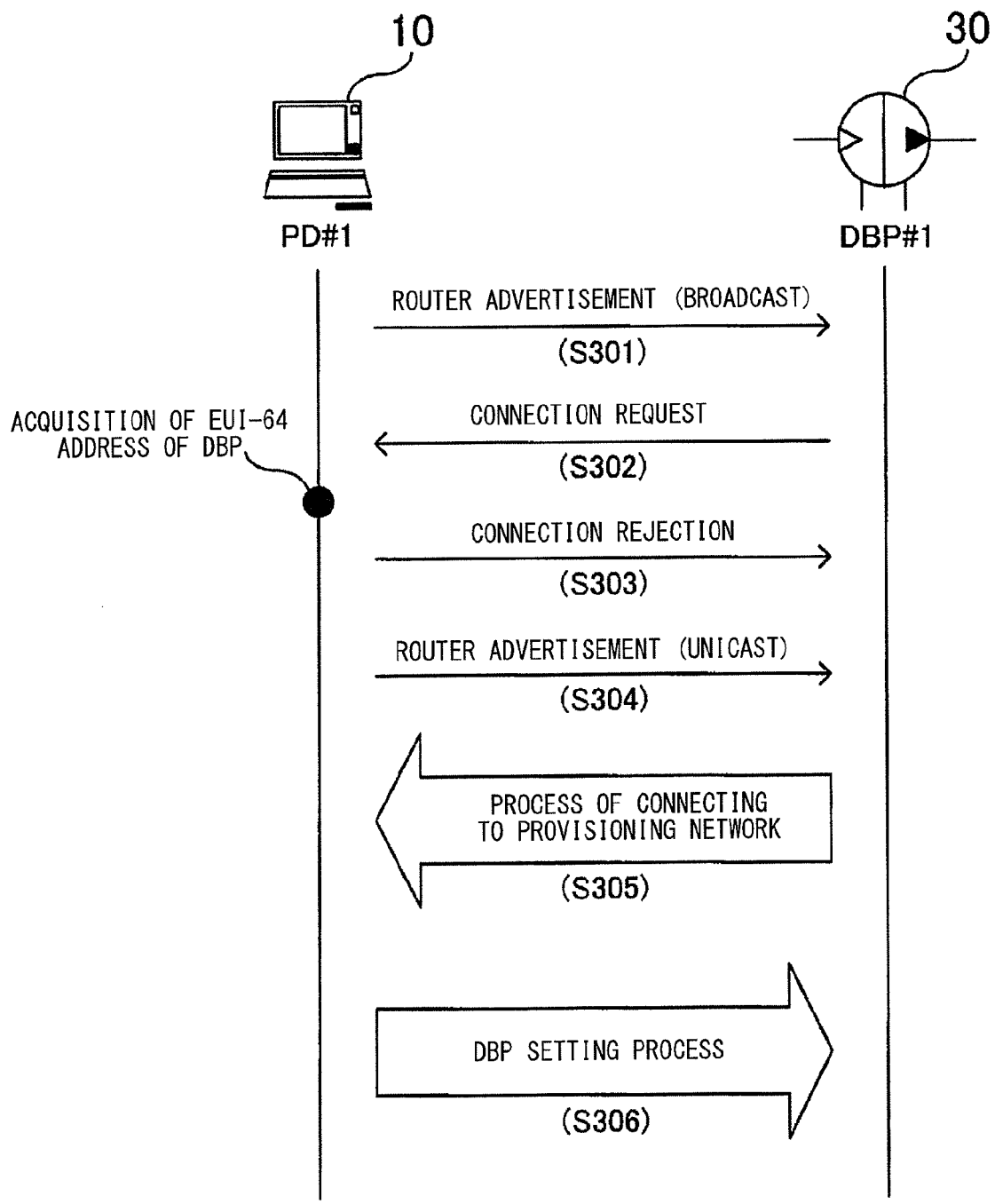
FIG. 6 is a sequence diagram illustrating a field-device search process by the PD in accordance with the first preferred embodiment of the present invention.

FIG. 6 is a sequence diagram illustrating a field-device search process by the PD in accordance with the first preferred embodiment of the present invention. As illustrated in FIG. 6, handheld PD #1 (10) first transmits a router advertisement to each DBP in the broadcast mode so as to search for DBP #1 (30) located within the router advertisement zone (step S301). Next, DBP #1 (30) receiving the router advertisement transmits a connection request to the provisioning network 1 (step S302). Here, handheld PD #1 (10) acquires an EUI-64 address of DBP #1 (30) located within the router advertisement zone from the result of the connection request for the provisioning network of DBP #1 (30).

A message of temporary connection rejection is transmitted to DBP #1 (30), so that DBP #1 (30) waits for a router advertisement in a waiting state (step S303). Handheld PD #1 (10) retransmits the router advertisement to DBP #1 (30) in the unicast mode on the basis of the previously acquired EUI-64 address (step S304). Next, DBP #1 (30) receiving the router advertisement in the waiting state is connected to the provisioning network 1 in the same procedure as in the related art (step S305). Here, if the connection is completed, handheld PD #1 (10) performs setting of network parameters to DBP #1 (30) (step S306).

Thereby, the handheld PD can actually transmit the router advertisement only to the DBP in operation within the router advertisement zone in the unicast mode without randomly transmitting the router advertisement to all DBPs of which setting information is managed. In addition, it is possible to select an arbitrary DBP without knowing in advance an arbitrary EUI-64 address of the DBP.

In ISA 100.11a, if a field device such as a DBP does not obtain a response within a given time after transmitting a connection request to a wireless network, regardless of whether the provisioning network is a target network, a process of waiting for the router advertisement again is defined. Because an initial value of a timeout period of the connection request transmitted by the DBP is defined as 60 sec, it is possible to quickly transition the DBP to a state of waiting for the router advertisement by explicitly returning a message indicating temporary connection rejection to the connection request (step S303) as in FIG. 6. At this time, although the returned message indicating the temporary connection rejection may be an error message to be used in a general connection process, an independent message for explicitly indicating the temporary connection rejection may be newly defined and used.

Figure 7:
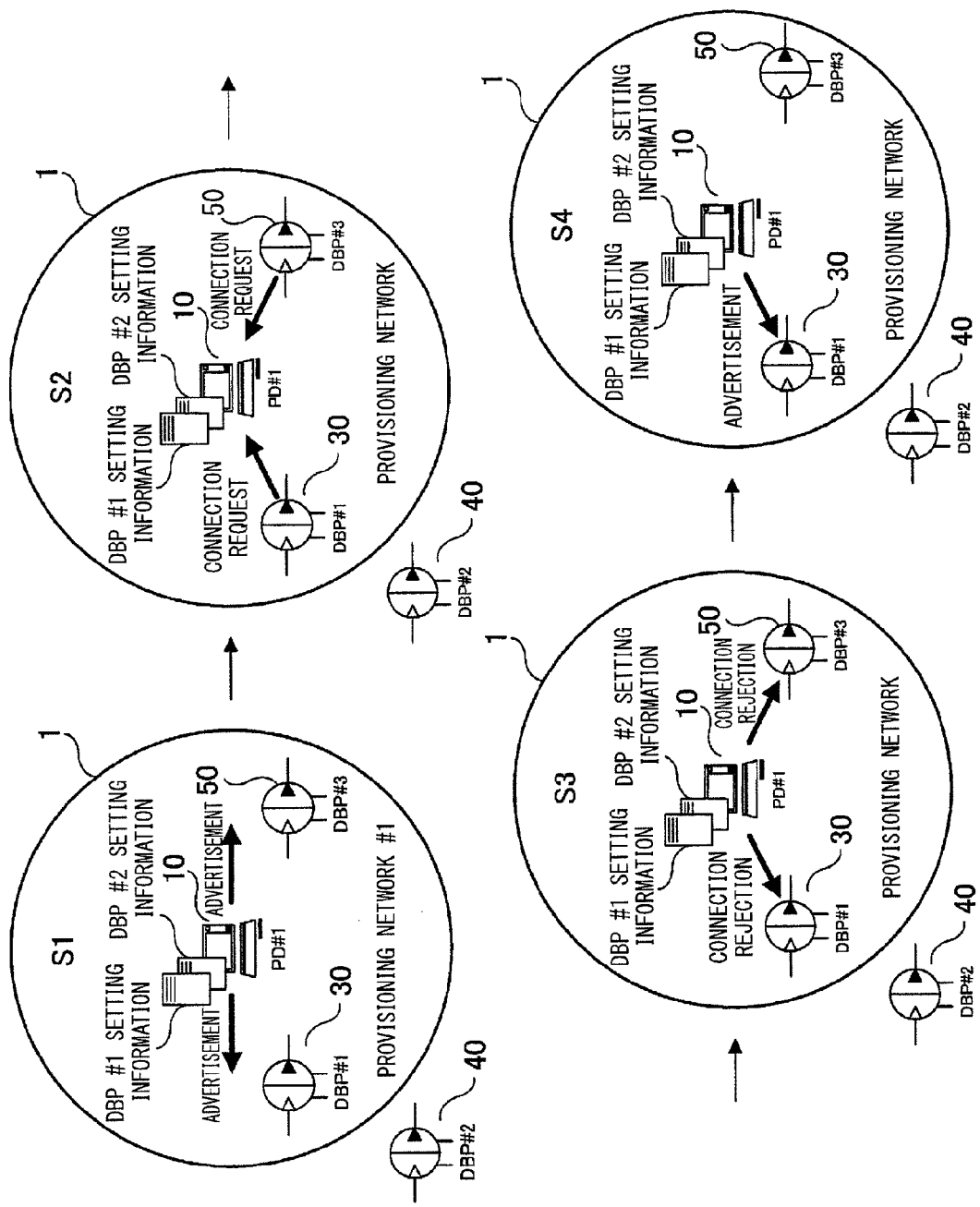
FIG. 7 is a diagram illustrating an operation example of a field-device search by the PD in accordance with the first preferred embodiment of the present invention.

FIG. 7 is a diagram illustrating an operation example of a field-device search by the PD in accordance with the first preferred embodiment of the present invention. In FIG. 7, handheld PD #1 (10) is assumed to manage setting information of DBP #1 (30) and DBP #2 (40). In addition, it is assumed that DBP #1 (30) and DBP #3 (50) are located inside the router advertisement zone of handheld PD #1 (10) and DBP #2 (40) is located outside the router advertisement zone.

In order to search for DBP #1 (30) and DBP #3 (50) located within the router advertisement zone, handheld PD #1 (10) first transmits the router advertisement in the broadcast mode (S1). Because DBP #1 (30) and DBP #3 (50) are located inside the router advertisement zone of handheld PD #1 (10) together, DBP #1 (30) and DBP #3 (50) receive the router advertisement transmitted by handheld PD #1 (10), and transmit connection requests to handheld PD #1 (10).

On the other hand, because DBP #2 (40) is located outside the router advertisement zone, DBP #2 (40) does not receive the router advertisement. Therefore, DBP #2 (40) does not transmit the connection request to handheld PD #1 (10) (S2).

In handheld PD #1 (10) learning EUI-64 addresses of DBP #1 (30) and DBP #3 (50) from source addresses of connection request messages transmitted by DBP #1 (30) and DBP #3 (50), the connection control unit 10*d* returns a response message indicating a connection error and temporarily rejects a connection to the provisioning network 1 of DBP #1 (30) and DBP #3 (50) (S3). Next, handheld PD #1 (10) compares EUI-64 addresses of DBP #1 (30) and DBP #2 (40) of which setting information is managed by handheld PD #1 (10), to the EUI-64 addresses of DBP #1 (30) and DBP #3 (50) learned in step S2, and transmits the router advertisement only to a matching DBP in the unicast mode (S4). Specifically, handheld PD #1 (10) transmits the router advertisement only to DBP #1 (30). It is possible to minimize the number of objects of the router advertisement to be transmitted in the unicast mode.

Figure 8:
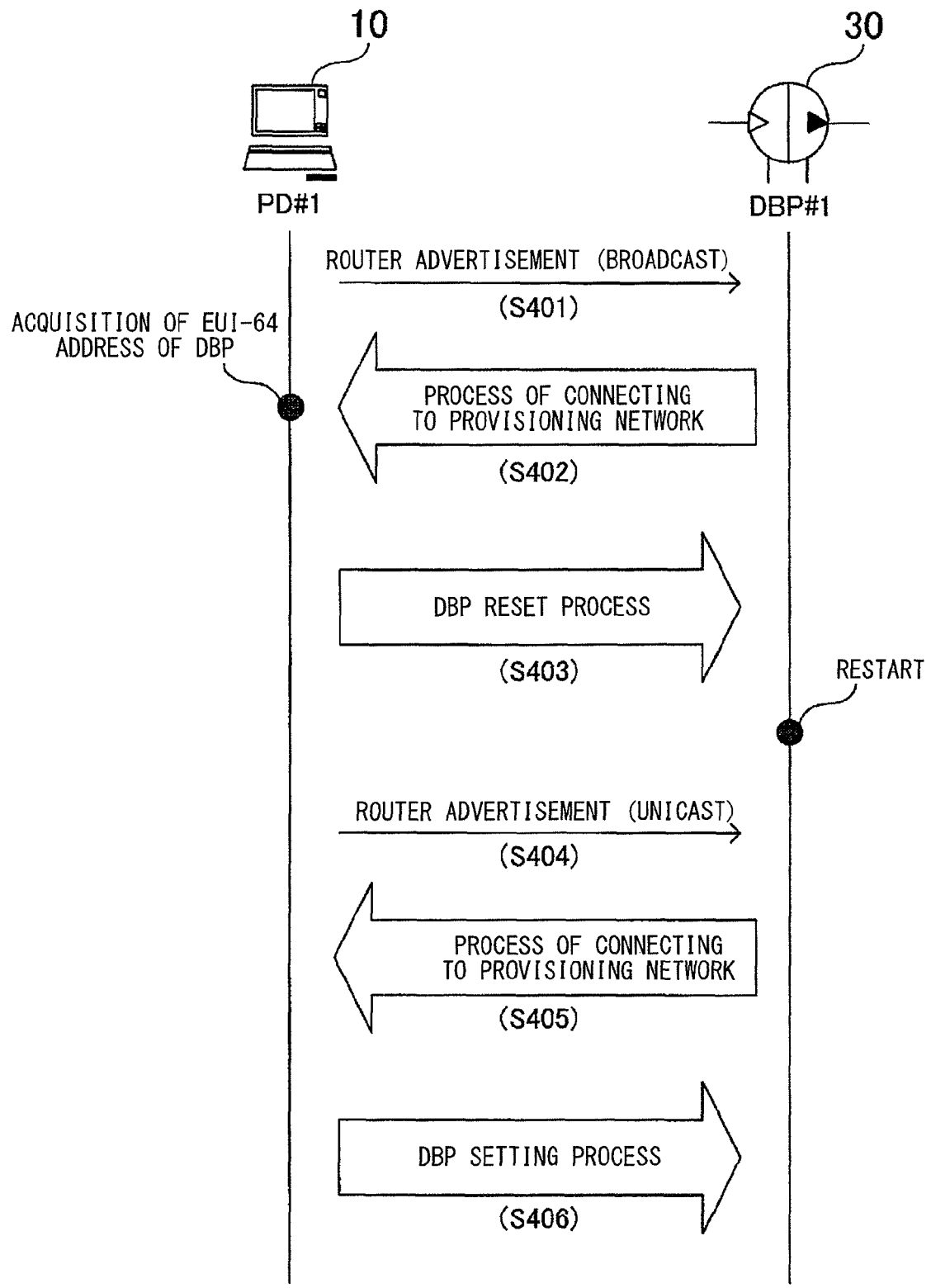
FIG. 8 is a diagram illustrating a disconnection sequence of a field device by the restart of the PD in accordance with the first preferred embodiment of the present invention.
Figure 9:
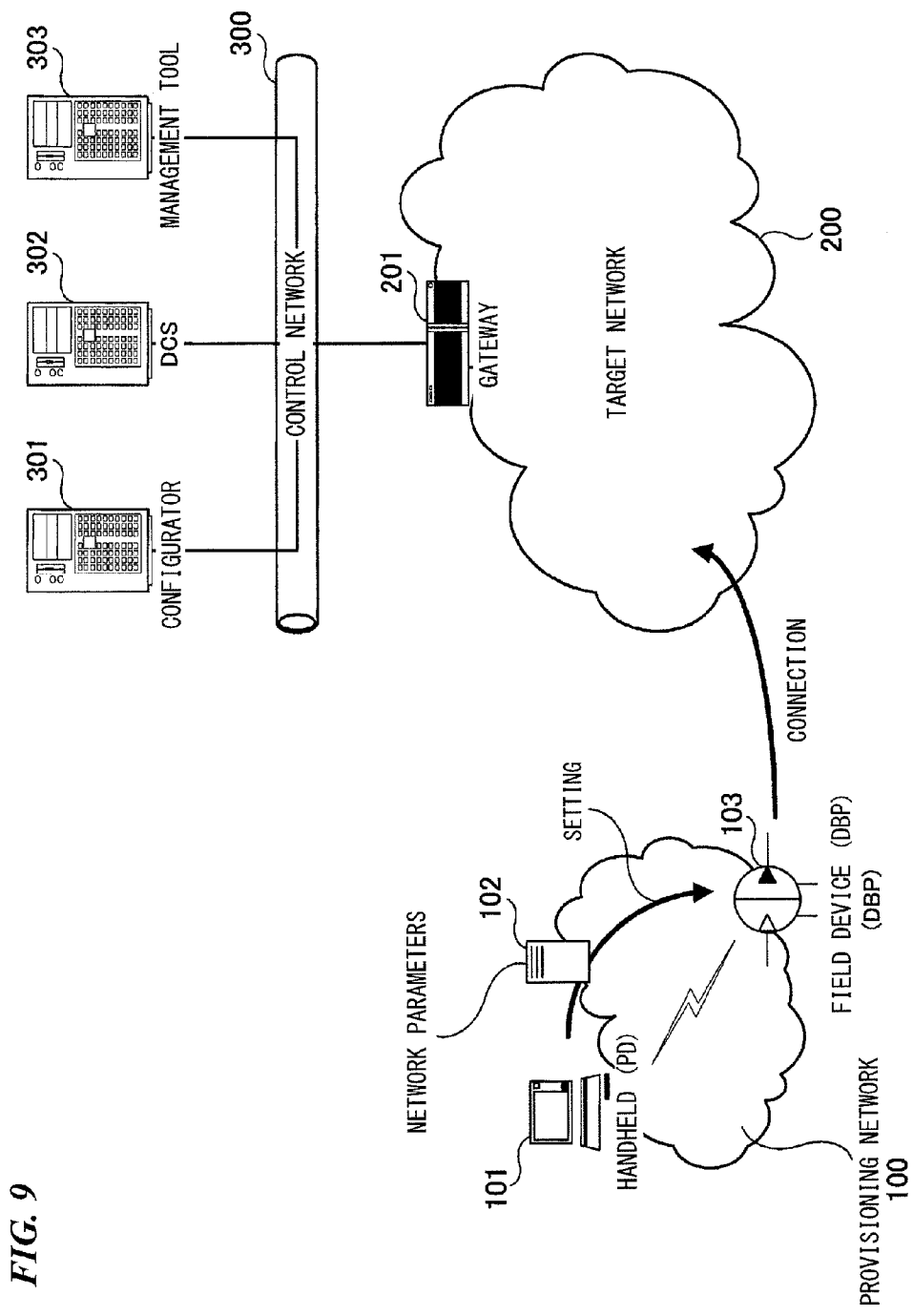
FIG. 9 is a diagram illustrating a relationship between the provisioning network and the target network.
Figure 10:
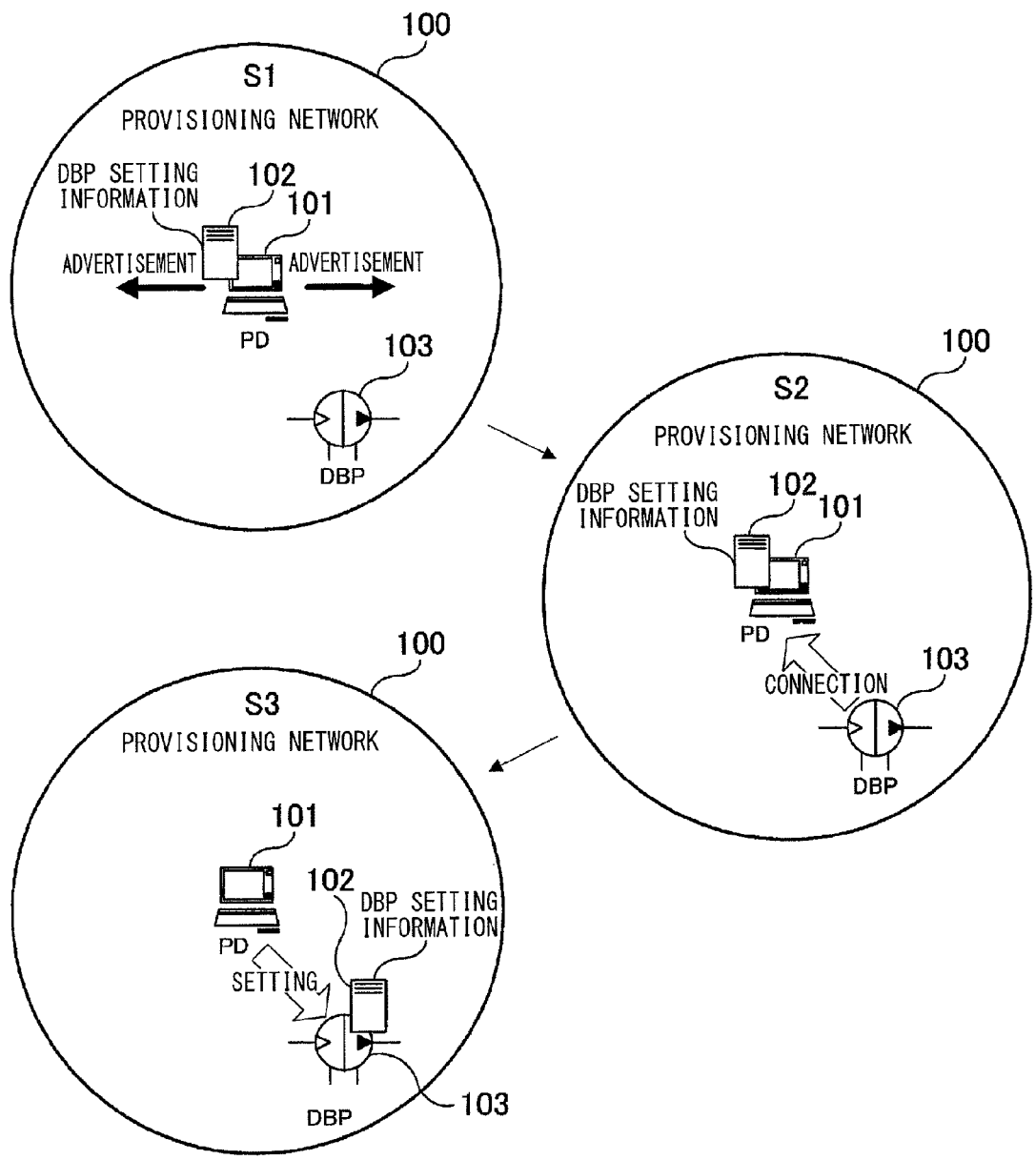
FIG. 10 is a diagram illustrating the provisioning process by the PD in accordance with the related art.
Figure 11:
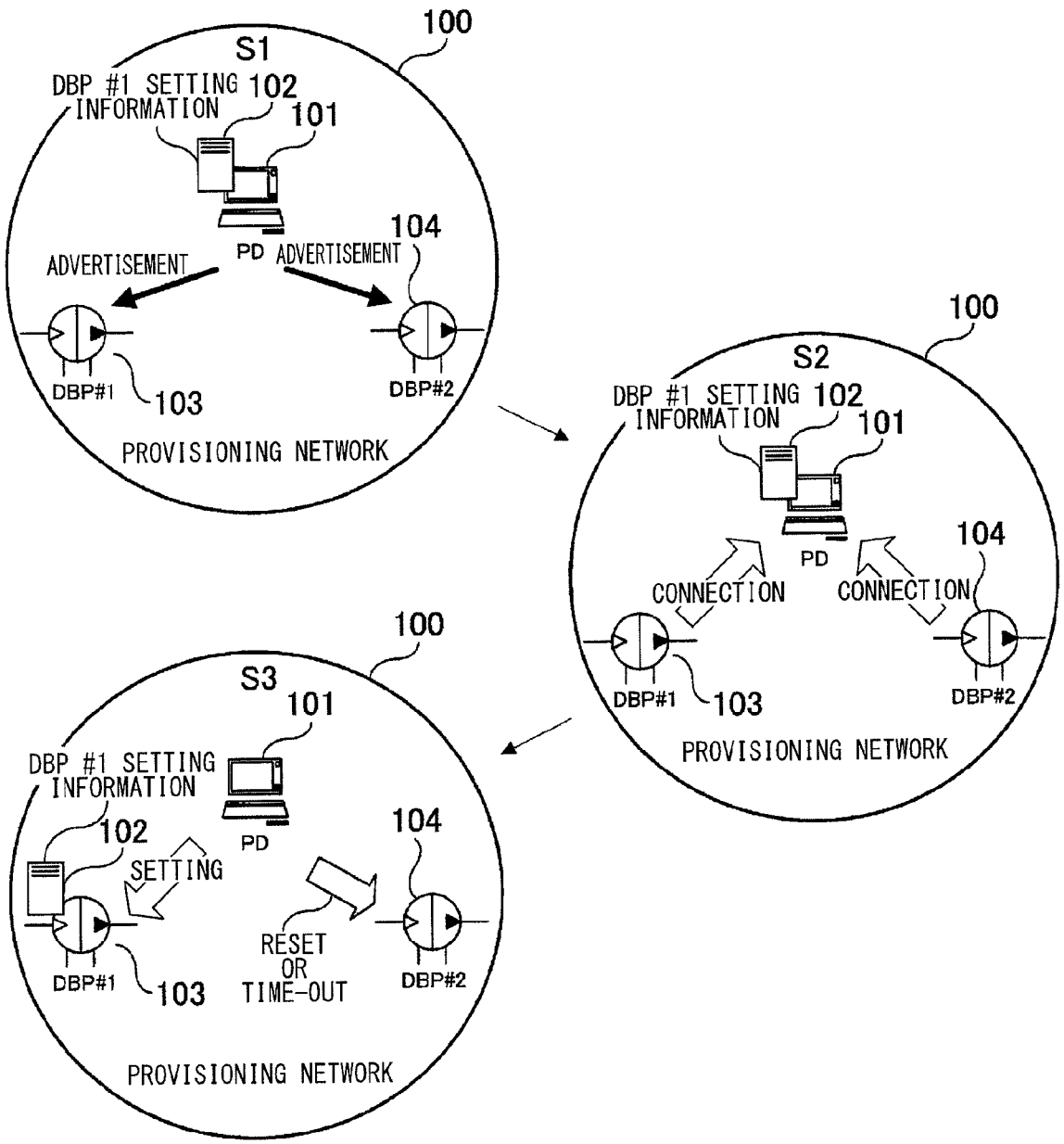
FIG. 11 is a diagram illustrating the provisioning process to the plurality of field devices.

In addition, once the process of connecting to the provisioning network of the DBP has been completed, the handheld PD may disconnect the DBP from the provisioning network by prompting the DBP to perform a restart operation. FIG. 8 is a diagram illustrating a disconnection sequence of a field device by the restart of the PD in accordance with the first preferred embodiment of the present invention. As illustrated in FIG. 8, in handheld PD #1 (10), the router advertisement unit 10*a* broadcasts the router advertisement (step S401), and the connection control unit 10*d* issues a restart (reset) request to DBP #1 (30) ending the connection process (step S402) directed to the provisioning network 1 (step S403). Thereby, DBP #1 (30) temporarily disconnects the field device from the provisioning network 1.

Thereafter, in handheld PD #1 (10), the router advertisement unit 10*a* transmits the router advertisement in the unicast mode (step S404). DBP #1 (30) receiving the router advertisement is connected to the provisioning network 1 (step S405). Here, if the connection is completed, handheld PD #1 (10) performs setting of network parameters to DBP #1 (30) by the parameter setting unit 10*b* (step S406).

Effect of Preferred Embodiment

According to a PD (handheld PD #1) related to the preferred embodiment of the present invention as described above, the router advertisement unit 10*a* uniquely designates a field device (DBP #1) that is an object of provisioning among field devices (DBPs #1 and #2) located within a router advertisement zone, and transmits the router advertisement to the designated field device (DBP #1) in the unicast mode. After the field device (DBP #1) receiving the router advertisement is connected to the provisioning network 1, the parameter setting unit 10*b* performs setting of managed network parameters (DBP #1 setting information 10*c*) to the designated field device (DBP #1).

In order to transmit the router advertisement in the unicast mode as described above, the PD can uniquely designate the field device that is the object of provisioning and thus remove uncertainty related to a connection between the PD and the field device. In addition, even when a plurality of PDs are in the neighborhood, the field device located in an overlapping portion between the provisioning networks can avoid unnecessary router advertisement reception and optimize a PD search process. As a result, the field device can avoid a random PD search by trial and error and reduce resource consumption.

In addition, according to the PD related to the preferred embodiment of the present invention, the router advertisement unit 10a can transmit the router advertisement to an arbitrary field device in the unicast mode using an EUI-64 address associated with setting information of the field device managed by the PD as a destination address of a MAC sub-layer header. In addition, when there is no response from the field device that is the object of provisioning for the router advertisement transmitted in the unicast mode, the router advertisement unit 10a can maintain compatibility for the field device incapable of receiving the router advertisement transmitted in the unicast mode by transmitting the router advertisement in the broadcast mode.

In addition, according to the PD related to the preferred embodiment of the present invention, it is possible to transmit the router advertisement only to the field device in operation within the router advertisement zone without randomly transmitting the router advertisement to all field devices of which setting information is managed by the PD by transmitting the router advertisement in the broadcast mode before transmitting the router advertisement in the unicast mode and dynamically acquiring a list of all field devices in the router advertisement zone, and it is possible to avoid unnecessary resource consumption. It is possible to quickly transition a field device to a state of waiting for the router advertisement by transmitting a message for temporarily rejecting a connection request of a field device when the list of field devices is dynamically acquired and rejecting participation in the provisioning network of the field device issuing the connection request or by requesting the field device ending a connection to the provisioning network to perform a restart operation and temporarily disconnecting the field device from the provisioning network.

A method of setting network parameters in a provisioning network in accordance with the present invention is applied to, for example, the provisioning network system 100 including field devices (DBP #1 and DBP #2) that are the objects of provisioning and PDs (PD #1 and PD #2) connected to the field devices (DBP #1 and DBP #2) via provisioning networks #1 and #2 separated from the target network in FIG. 1.

A method of setting network parameters in a provisioning network in accordance with the present invention has, for example, an advertisement step (S101) in which PDs (PD#1 and PD#2) uniquely designate a field device (DBP #1 or DBP #2) that is an object of provisioning among field devices located within a router advertisement zone and transmit a router advertisement to the designated field device in a unicast mode, a connection step (S102) in which the field device (DBP #1 or DBP #2) receiving the router advertisement is connected to provisioning network #1 (#2) by issuing a connection request, and a provisioning step (S103) in which the PD (PD #1 or PD #2) performs setting of managed network parameters (DBP #1 setting information 10c or DBP #2 setting information) to the designated field device (DBP #1 or DBP #2), as illustrated in FIG. 5A.

According to the present invention, in order to transmit the router advertisement in the unicast mode, the PDs (PD #1 and PD #2) can uniquely designate the field device (DBP #1 or DBP #2) that is the object of provisioning and thus remove uncertainty related to connections between the PDs (PD #1 and PD #2) and the field device (DBP #1 or DBP #2). In addition, even when a plurality of PDs (PD #1 and PD #2) are in the neighborhood, the field devices (DBP #1 and DBP #2) located in an overlapping portion between provisioning networks #1 and #2 can avoid unnecessary router advertisement reception and optimize a PD search process. As a result, the field devices (DBP #1 and DBP #2) can avoid a random search of PDs (PD #1 and PD #2) by trial and error and reduce resource consumption.

According to the present invention, in OTA provisioning, the PD optimizes an OTA provisioning process by uniquely designating a field device, which is an object of provisioning. The present invention can be applied to all handheld PDs corresponding to the OTA provisioning in ISA 100.11. In addition, the present invention is equally applied to industrial wireless communication standards that perform the same operation as in ISA 100.11a, without being limited to ISA 100.11a.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A provisioning device comprising:
   a router advertisement transmitter that selects a field device to be provisioned among field devices located within a router advertisement zone of the provisioning device, the router advertisement transmitter generating a router advertisement frame that includes a router advertisement and a medium access control (MAC) sub-layer header that designates a starting point address, which is a transmission source of the router advertisement, and an ending point address, which is a transmission destination of the router advertisement, the router advertisement transmitter transmitting the router advertisement frame to the selected field device in a unicast mode using an address associated with network parameters of the selected field device as the ending point address of the router advertisement frame;
   a connection controller that controls a connection to a provisioning network of the field device that has received the router advertisement frame; and
   a parameter setter that performs setting of the network parameters of the field device that has received the router advertisement frame via the provisioning network so that the field device that has received the router advertisement frame can be connected to a target network that is separated from the provisioning network.

2. The provisioning device according to claim 1, wherein the router advertisement transmitter generates the address associated with the network parameters of the selected field device as the ending point address in the medium access control (MAC) sub-layer header of the router advertisement frame and transmits the router advertisement frame to an arbitrary field device, which is the object of provisioning, of the provisioning device in the unicast mode.

3. The provisioning device according to claim 1, wherein the router advertisement transmitter transmits the router advertisement frame in a broadcast mode if there is no response from the selected field device, which is the object of provisioning, for the router advertisement frame transmitted in the unicast mode.

4. The provisioning device according to claim 1, wherein the router advertisement transmitter dynamically acquires a list of all of the field devices located within the router advertisement zone by transmitting the router advertisement frame in a broadcast mode before the router advertisement frame is transmitted in the unicast mode.

5. The provisioning device according to claim 4, wherein, when the router advertisement transmitter dynamically acquires the list of the field devices, the connection control transmitter transmits a message indicating temporary connection rejection for a connection request of the field device to reject participation in the provisioning network of the field device that has issued the connection request.

6. The provisioning device according to claim 4, wherein, when the router advertisement transmitter dynamically acquires the list of the field devices, the connection controller temporarily disconnects the field device from the provisioning network by sending a restart request to the field device that ends the connection to the provisioning network.

7. A method of setting network parameters in a provisioning network system including field devices and a provisioning device connected to a field device to be provisioned via a provisioning network separated from a target network, the method comprising:
  an advertisement step of selecting, by the provisioning device, the field device to be provisioned among the field devices located within a router advertisement zone of the provisioning device, generating a router advertisement frame that includes a router advertisement and a medium access control (MAC) sub-layer header that designates a starting point address, which is a transmission source of the router advertisement, and an ending point address, which is a transmission destination of the router advertisement, and an ending point address, which is a transmission destination of router advertisement, and transmitting the router advertisement frame to the selected field device in a unicast mode using an address associated with network parameters of the selected field device as the ending point address of the router advertisement frame;
  a connection step of issuing, by the field device that has received the router advertisement frame, a connection request and connecting to the provisioning network; and
  a provisioning step of performing, by the provisioning device, setting of the network parameters of the field device that has received the router advertisement frame via the provisioning network so that the field device that has received the router advertisement frame can be connected to the target network.

8. The method of setting network parameters according to claim 7, wherein the advertisement step comprises:
  generating the address associated with the network parameters of the field device as the ending point address in the medium access control (MAC) sub-layer header of the router advertisement frame; and
  transmitting the router advertisement frame to an arbitrary field device, which is the object of provisioning, of the provisioning device in the unicast mode.

9. The method of setting network parameters according to claim 7, wherein the advertisement step comprises:
  transmitting the router advertisement frame in a broadcast mode if there is no response from the selected field device, which is the object of provisioning, for the router advertisement frame transmitted in the unicast mode.

10. The method of setting network parameters according to claim 7, wherein the advertisement step comprises:
  dynamically acquiring a list of all of the field devices located within the router advertisement zone by transmitting the router advertisement frame in a broadcast mode before the router advertisement frame is transmitted in the unicast mode.

11. The method of setting network parameters according to claim 10, wherein the advertisement step comprises:
  transmitting a message indicating temporary connection rejection for a connection request of the field device to reject participation in the provisioning network of the field device that has issued the connection request when a router advertisement transmitter dynamically acquires the list of the field devices.

12. The method of setting network parameters according to claim 10, wherein the advertisement step comprises:
  temporarily disconnecting the field device from the provisioning network by sending a restart request to the field device that ends the connection to the provisioning network when a router advertisement transmitter dynamically acquires the list of the field devices.

13. A provisioning device comprising:
  a router advertisement transmitter that selects a field device to be provisioned among field devices located within a router advertisement zone of the provisioning device, the router advertisement transmitter generating a router advertisement frame including a router advertisement and an ending point address, which is a transmission destination of the router advertisement, wherein an address associated with network parameters of the selected field device is designated as the ending point address, the router advertisement transmitter transmitting the router advertisement frame to the selected field device in a unicast mode;
  a connection controller that controls a connection to a provisioning network of the field device that has received the router advertisement frame; and
  a parameter setter that performs setting of the network parameters of the field device that has received the router advertisement frame via the provisioning network so that the field device that has received the router advertisement frame can be connected to a target network that is separated from the provisioning network.

14. The provisioning device according to claim 13, wherein the router advertisement transmitter generates the address associated with the network parameters of the field device as the ending point address in a medium access control (MAC) sub-layer header of the router advertisement frame and transmits the router advertisement frame to an arbitrary field device, which is the object of provisioning, of the provisioning device in the unicast mode.

15. The provisioning device according to claim 13, wherein the router advertisement transmitter transmits the router advertisement frame in a broadcast mode if there is no response from the selected field device, which is the object of provisioning, for the router advertisement frame transmitted in the unicast mode.

16. The provisioning device according to claim 13, wherein the router advertisement transmitter dynamically acquires a list of all of the field devices located within the router advertisement zone by transmitting the router advertisement frame in a broadcast mode before the router advertisement frame is transmitted in the unicast mode.

17. The provisioning device according to claim 16, wherein, when the router advertisement transmitter dynamically acquires the list of the field devices, the connection controller transmits a message indicating temporary connection rejection for a connection request of the field device to reject participation in the provisioning network of the field device that has issued the connection request.

18. The provisioning device according to claim 16, wherein, when the router advertisement transmitter dynamically acquires the list of the field devices, the connection controller temporarily disconnects the field device from the provisioning network by sending a restart request to the field device that ends the connection to the provisioning network.

\* \* \* \* \*